(12) United States Patent
Simlett et al.

(10) Patent No.: US 11,798,114 B2
(45) Date of Patent: Oct. 24, 2023

(54) APPARATUS AND METHOD FOR LOCATING A MOBILE ASSET

(71) Applicant: EYGS LLP, London (GB)

(72) Inventors: John Simlett, London (GB); Philipp Wolfgang Schartau, London (GB); Kulraj Singh Smagh, Coventry (GB); Tristram Musa Benson, Cambridge (GB); Michael Stefan Yorke, Cheshire (GB); Samuel Davies, Sawbridgeworth (GB); Stuart Barrass, London (GB)

(73) Assignee: EYGS LLP, London (GB)

( * ) Notice: Subject to any disclaimer, the term of this patent is extended or adjusted under 35 U.S.C. 154(b) by 364 days.

(21) Appl. No.: 16/634,674

(22) PCT Filed: Jul. 27, 2018

(86) PCT No.: PCT/GB2018/052134
§ 371 (c)(1),
(2) Date: Jan. 28, 2020

(87) PCT Pub. No.: WO2019/021020
PCT Pub. Date: Jan. 31, 2019

(65) Prior Publication Data
US 2020/0234390 A1    Jul. 23, 2020

(30) Foreign Application Priority Data
Jul. 28, 2017 (GB) ........................ 1712185

(51) Int. Cl.
*G06Q 50/30* (2012.01)
*G06Q 20/14* (2012.01)
(Continued)

(52) U.S. Cl.
CPC ............. *G06Q 50/30* (2013.01); *G06Q 10/10* (2013.01); *G06Q 20/145* (2013.01);
(Continued)

(58) Field of Classification Search
CPC .. G06Q 10/02; G06Q 20/145; G06Q 2240/00; G06Q 50/30
(Continued)

(56) References Cited

U.S. PATENT DOCUMENTS 4,965,821 A * 10/1990 Bishop ............... H04M 17/02
                                                     455/408
10,521,780 B1 * 12/2019 Hopkins, III .......... G06Q 20/12
(Continued)

FOREIGN PATENT DOCUMENTS

| WO | WO-2006/077638 A1 | 7/2006 | |
| WO | WO-2010/144490 A1 | 12/2010 | |
| WO | WO-2017145019 A1 * | 8/2017 | ............. G06Q 20/02 |

OTHER PUBLICATIONS

A resolution of sharing private charging piles based on smart contract. Hou, Yunfei et al. Jul. 1, 2017. 2017 13th International Conference on Natural Computation, Fuzzy Systems and Knowledge Discovery (ICNC-FSKD). pp. 3004-3008. (Year: 2017).*
(Continued)

*Primary Examiner* — Jeff Zimmerman
*Assistant Examiner* — Hunter A Molnar
(74) *Attorney, Agent, or Firm* — Alston & Bird LLP

(57) ABSTRACT

A node is provided for implementing an asset sharing scheme in which the asset is mobile. The node being is to determine a location of the mobile asset in dependence on data, relating to the mobile asset, that is recorded in a data corpus authenticated by a distributed authentication protocol. The node may be configured to interact with other nodes to implement the distributed authentication protocol.

13 Claims, 4 Drawing Sheets

(51) Int. Cl.
*H04W 4/029* (2018.01)
*H04W 4/40* (2018.01)
*G06Q 10/10* (2023.01)
*H04W 12/06* (2021.01)

(52) U.S. Cl.
CPC ............ *H04W 4/029* (2018.02); *H04W 4/40* (2018.02); *H04W 12/06* (2013.01); *G06Q 2240/00* (2013.01)

(58) Field of Classification Search
USPC .......................................................... 705/13
See application file for complete search history.

(56) References Cited

U.S. PATENT DOCUMENTS

| 2011/0213629 | A1* | 9/2011 | Clark | G06Q 30/0641 705/5 |
| 2016/0195404 | A1 | 7/2016 | Prasad et al. | |
| 2017/0046669 | A1 | 2/2017 | Chow et al. | |
| 2018/0374283 | A1* | 12/2018 | Pickover | H04L 9/0637 |
| 2019/0164137 | A1* | 5/2019 | Vincent | H04W 12/03 |

OTHER PUBLICATIONS

Franco, Pedro. *Understanding Bitcoin: Crytopgraphy, Engineering and Economics*, Wiley Fiance Series, Nov. 24, 2014, (143 pages). XP055393688. ISBN: 978-1-119-01916-9.

International Searching Authority, International Search Report and Written Opinion for International Application No. PCT/GB2018/052134, dated Oct. 4, 2018, (11 pages), European Patent Office, Rijswijk, Netherlands.

Christidis, Konstantinos et al. *Blockchains and Smart Contracts for The Internet of Things*, IEEE Access, vol. 4, May 10, 2016, pp. 2292-2303. DOI: 10.1109/Access.2016.2566339.

* cited by examiner

APPARATUS AND METHOD FOR LOCATING A MOBILE ASSET

CROSS REFERENCE TO RELATED APPLICATIONS

This application is a National Stage Application, filed under 35 U.S.C. § 371, of International Application No. PCT/GB2018/052134, filed Jul. 27, 2018, which international application claims priority to and the benefit of United Kingdom Application No. 1712185.6, filed Jul. 28, 2017; the contents of both of which as are hereby incorporated by reference in their entireties.

BACKGROUND

Related Field

This invention relates to an apparatus and method for locating a mobile asset.

At present, most automobiles are privately owned and used exclusively by their owners. For much of the time these vehicles are unused. There are some limited opportunities to share the usage of automobiles: for example taxis, car share arrangements and car hire companies. These schemes can increase the proportion of time for which an individual vehicle is used, which can reduce overall costs to the users. It is anticipated that in the future there will be increased demand for shared vehicle usage schemes, especially in urban areas.

Description of Related Art

In order to administer a shared usage scheme, a number of contractual arrangements and physical security protocols need to be put in place. If there are multiple vehicle owners in the scheme then there is a need to maintain a register of who provides each vehicle. There may need to be a way for users to reserve access to vehicles. There needs to be a mechanism for ensuring that vehicles can only be accessed by authorised users, and there needs to be a way to manage payments from users to the provider(s) of the vehicles. There may also need to be a way for users to find out where vehicles are located. There needs to be a mechanism for tracking vehicles so that their location can be determined and so that users are billed appropriately for using them. In existing vehicle share schemes these issues are either managed by dedicated staff who are associated with a vehicle's provider (as in taxi and conventional car hire schemes), or there is a single vehicle provider who operates a private database through which contractual and physical aspects are managed (as in current car share schemes). In the future, it may be desirable for to facilitate a different model. In that model, an individual vehicle owner might want to own a vehicle for their private use, but to permit others to use the vehicle for a fee at times when the owner does not need the vehicle for their own use. In this model, there might be no staff to manage the scheme and it would be impractical for an individual owner to operate their own private management database.

BRIEF SUMMARY

According to a first aspect, a node is provided for implementing an asset sharing scheme in which the asset is mobile. The node is configured to determine a location of the mobile asset in dependence on data, relating to the mobile asset, that is recorded in a data corpus authenticated by a distributed authentication protocol.

Other aspects may include one or more of the following:

The node may be configured to determine the location of the mobile asset in dependence on data that relates to sharing of the mobile asset. The node may be configured to determine the location of the mobile asset in dependence on data that indicates whether the mobile asset is currently available for being shared. The node may be configured to determine whether the mobile asset is available for being shared in dependence on a smart contract that is configured to access data recorded in the data corpus.

The node may be configured to determine the location of the mobile asset in dependence on a fixed location that is stored in respect of that mobile asset location in the data corpus. The fixed location may be a default location associated with the asset, and the node may be configured to not determine that a mobile asset that is unavailable for being shared is at its fixed location. The node may be configured to determine the location of the mobile asset in dependence on data received from the mobile asset and recorded in the data corpus.

The node may be configured to determine the location of the mobile asset responsive to a request from a user that identifies a location of that user. The asset sharing scheme may incorporate a plurality of mobile assets and the node may be configured to identify, responsive to the request, one or more of the plurality of mobile assets that are closest to the location of the user. The node may be configured to identify which of the one or more mobile assets closest to the location of the user is available for sharing. The node may be configured to provide, to the user, locations of mobile assets that are: (i) a mobile asset that is closest to the location of the user; and (ii) available for sharing.

The node may be configured to determine a usage fee for use of the asset based on the determined location. The node may be configured to determine whether use of the asset complies with a contract based on the determined location.

The node may be configured to interact with other nodes to implement the distributed authentication protocol. The node may be configured to receive data relating to the mobile asset and record it in the data corpus.

The distributed authentication protocol may be a blockchain protocol.

According to a second aspect, a method is provided for implementing an asset sharing scheme in which the asset is mobile. The method comprises determining a location of the mobile asset in dependence on data, relating to the mobile asset, that is recorded in a data corpus authenticated by a distributed authentication protocol.

BRIEF DESCRIPTION OF THE FIGURES

The present invention will now be described by way of example with reference to the accompanying drawings. In the drawings.

DETAILED DESCRIPTION OF VARIOUS EMBODIMENTS

Figure 1:
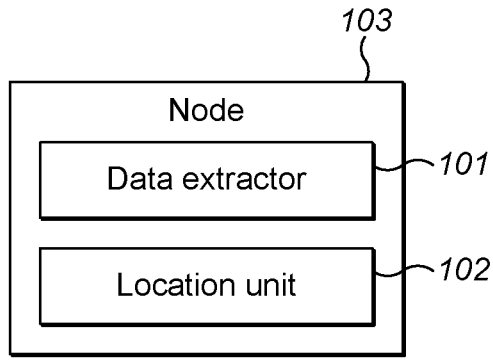
FIG. 1 shows an example of a node.
Figure 3:
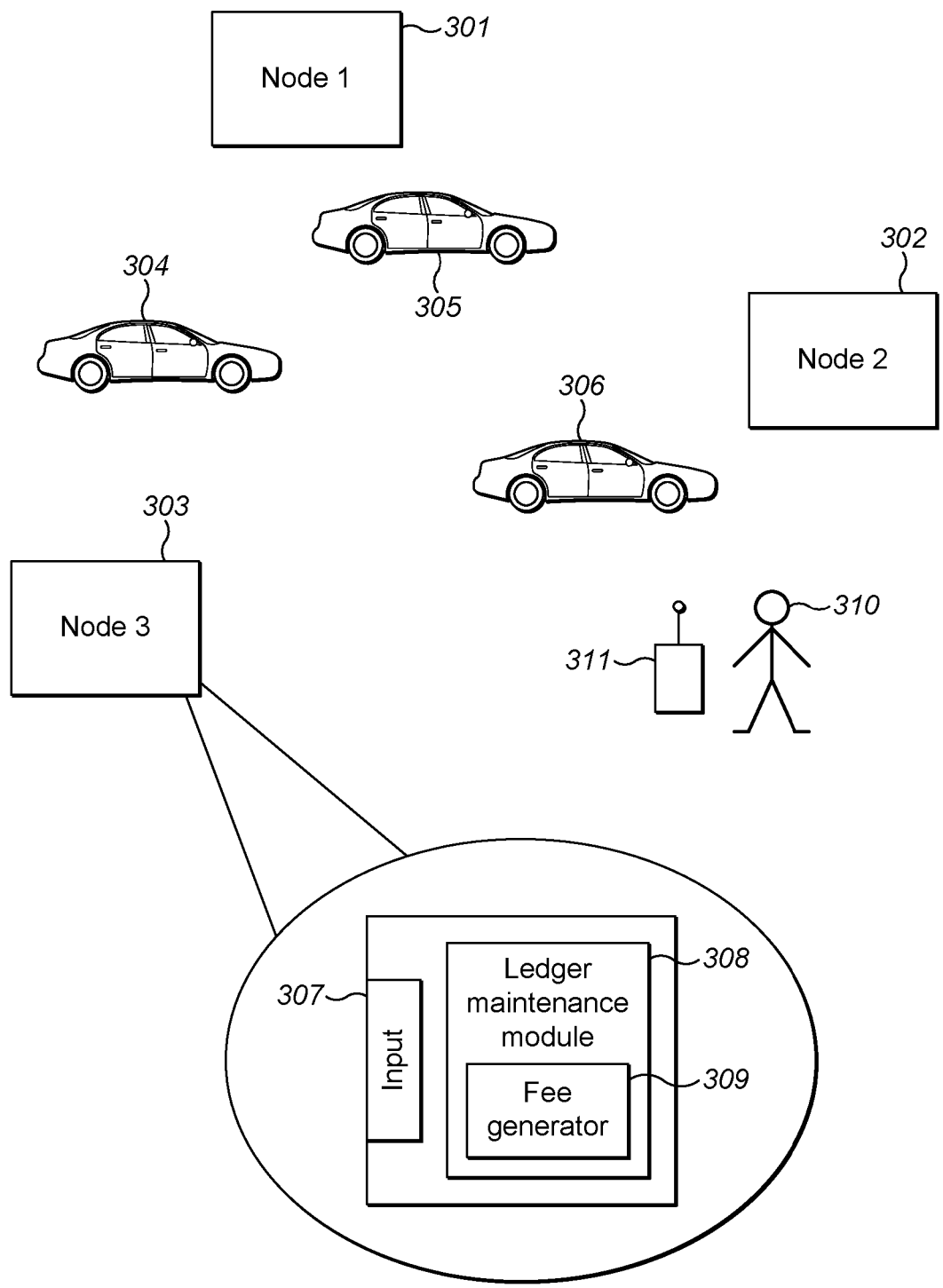
FIG. 3 shows a system for implementing a shared usage scheme.

An example of a node is shown in FIG. 1. The node is part of an asset sharing scheme that enables mobile, physical assets to be shared between multiple users, who in some instances may also be part owners of the assets. In one example, the node may be one of a plurality of nodes that together implement a distributed authentication protocol for administering the asset sharing scheme (an example of such an arrangement is shown in FIG. 3). The protocol is such that the devices cooperating in the protocol collectively authenticate blocks of data that are added to a corpus or chain of data. In another example, the node may be configured to communicate with one or more nodes that implement the distributed authentication protocol, enabling the node to query those nodes for data stored in the data corpus. The node 103 in FIG. 1 comprises data extractor 101, which may be configured to access data stored in the data corpus. The node also comprises a location unit 102, which is configured to determine a location of a mobile asset in dependence on data, relating to the mobile asset, that is recorded in the data corpus.

The distributed authentication protocol may be a blockchain and/or distributed ledger protocol. New blocks that are to be added to the data corpus could be authenticated in response to them being from a trusted source. Alternatively, they could be authenticated through consensus protocols such as proof of work or proof of stake. In the event that there is disagreement between the participating nodes as to which is the authoritative version of the corpus or chain of data the protocol may be designed such that the majority view of the participating nodes, or the view associated with the most work, may prevail. The distributed authentication protocol could, for example, be or be based on Ethereum, Monax or Openchain. For convenience, the resulting data corpus will be referred to as a "blockchain" in the description below, but it should be understood that although the system may use a blockchain protocol it may also use a protocol other than a blockchain protocol.

The distributed authentication protocol is preferably configured to administer a scheme whereby the mobile assets can be shared between multiple users. The resulting blockchain may contain records which hold data that is to be memorialised. Examples of include user data and usage data. The blockchain may be referenced by a set of instructions for implementing a future transaction. Such a set of instructions is known as a smart contract. The smart contract will reference one or more file locations in the blockchain to process transactions.

The blockchain may store data that is useful to the node in determining the location of a mobile asset. Examples include: whether the mobile asset is currently available for being shared (which may indicate whether the asset can be expected to be at its default location); any fixed location that is associated with the asset (e.g. a parking space that is a default location for the asset); data received from the mobile asset itself (e.g. from a GPS device or similar attached to the asset); and data received from other devices that is relevant to the mobile asset (e.g. from roadside beacons or similar that have communicated with the asset or from other assets in the scheme).

Some of the data that may be recorded in the blockchain and later used to determine the location of a mobile asset may be collected for the purpose of determining an asset's location. Other data may be collected for a different purpose, but can nonetheless be used by node 103 to derive an indication of an asset's location. Data that falls into this category includes data that is primarily recorded for administering asset sharing. For example, the blockchain may be referenced by a smart contract that manages the use of the asset by a user. The primary purpose of that smart contract could be to generate a usage fee for the use of the asset. A secondary purpose might be to enable node 103 to determine whether the asset is currently available for use or not. If the contract is open, this will tend to indicate that the asset is being used. Similarly, if the contract is closed, this will tend to indicate that the asset is available. Node 103 may come to a number of conclusions based on this information, such as: the asset is being used so it is unlikely to be in its default location; the asset is being used so there may be other information available (such as tracking data) that may provide more information as to the asset's current whereabouts; and/or the asset is being used so it is unnecessary to investigate the asset's location further. There are various reasons why it can be useful to know the location of a mobile asset. Some of these may be directly relevant to the administration of the asset sharing scheme. For example, tracking data may be collected from the mobile asset and recorded in the blockchain during use. This data can later be used to generate an appropriate usage fee. It could also be used to determine the whereabouts of an asset that may not have been returned to its default location after use. It could also be used during use, e.g. to check that the asset has not been removed from a pre-agreed geographical area. Other applications for knowing the location of the asset do not relate to a past or existing use of the asset. Instead they may provide information that is relevant to potential future use, e.g. by informing a potential user of which assets are closest to his or her location.

Figure 2:
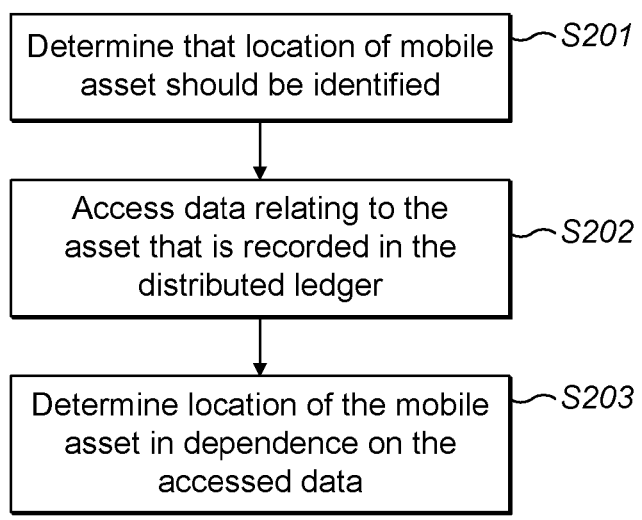
FIG. 2 shows an overview of a method for determining the location of a mobile asset.

A broad overview of a method that may be implemented by a node such as that shown in FIG. 1 is shown in FIG. 2. The method commences in step S201 with the node determining that the location of the mobile asset should be determined. This determination could be made responsive to a user request, or it could be something that the node is configured to do at predetermined time intervals. In step S202 the node accesses data relating to the asset that is stored in the blockchain. Finally, the node determines the location of the node in dependence on the accessed data (step S203).

Using data that has been recorded in a blockchain to derive the location of a mobile asset may have a number of advantages. First, if that data has been collected anyway, for the purposes of administering an asset sharing scheme, then it is efficient to reuse that data to provide general location services. Second, because the data is recorded in a blockchain it can be trusted. Third, the data is recorded across a plurality of nodes, meaning that there are many nodes from which the data can be accessed.

An example of a system for implementing a shared usage scheme is shown in FIG. 3. The system comprises a plurality of nodes, which are shown as computing devices 301 to 303. An individual node could be any computing device, i.e. a machine that can be instructed to automatically carry out calculations. Examples include servers, PCs, laptops, tablets, mobile phones etc. An individual node could also be "device" that is implemented via a distributed processing arrangement, such as the cloud. Any of these devices may include a user input mechanism, such as a keyboard or touchscreen, and an output mechanism, such as a display, in addition to a processing means such as a central processing unit (CPU). In one preferred arrangement, the nodes form a peer-to-peer network in which the devices exchange messages via either wired or wireless links to communicate and coordinate their actions.

The nodes are configured to interact to implement a distributed authentication protocol. This generates a consensus of replicated and synchronised data that is shared across the nodes. Each node may be configured to implement consensus algorithms to ensure replication of the data across the nodes. This arrangement does not require a central administrator. This arrangement will not usually require centralised storage, although centralised storage may be provided in some implementations to speed up interactions for users. Thus, the arrangement could include decentralised storage, storage in side chains or else centralised storage for optimisation and efficiency reasons.

The system also comprises one or more mobile, physical assets. In FIG. 3, a plurality mobile assets 304 to 306 are shown. The assets could be any physical property that is mobile and capable of belonging to one or more owners. The owners could be individuals or organisations, such as companies. In some implementations, the assets could be self-owning. It is envisaged that the physical assets are likely to be associated with high monetary value in most practical implementations, as such assets are most likely to be susceptible to rental and/or shared ownership. In FIG. 3 the mobile assets are shown as cars, but the techniques described herein may be equally applied to other assets that can be freely moved. Examples include any type of vehicle, including private or commercial aeroplanes, and expensive and/or unusual sporting equipment (e.g. diving equipment). Therefore, when the description below refers to cars, it should be understood that this is for the purposes of example only and it is equally applicable to any type of mobile asset.

Node 103 may be configured to obtain data from any of nodes 303 to 306 that it can use to deduce information about the location of a particular asset. In some examples, the functional blocks of node 103 may be incorporated within one of nodes 303 to 306. This would create a single node that is capable of maintaining a blockchain and deriving location information from data recorded in that chain. In other examples, a node (whether that is node 103, one of nodes 303 to 306 or a combined node) may be configured to pass data recorded in the blockchain to another device to calculate the location of an asset. That other device could be, for example, a device with higher processing power or specialist location-determining software. The other device could be implemented by a processor in the cloud.

Node 303 of FIG. 3 is shown in more detail than the others to better illustrate how it facilitates shared usage of an asset. The node 303 comprises an input 307 that is configured to receive data that is indicative of use of one or more of the physical assets. That data may be received by the node directly from the asset or it may be received via an intermediary device. In many implementations, the use data may originate from one or more sensors that are attached to the asset. The data is typically transferred wirelessly from the asset, e.g. via an Internet of Things (IoT) communications protocol. For example, the cars may be configured to periodically report back to the nodes about their location in order that the user can be appropriately charged for their journey. This tracking data may be derived from GPS sensors, mobile phone cell records, interactions between sensors on the car and roadside beacons etc. Tracking data is suitably recorded in the blockchain by ledger maintenance module 308.

Ledger maintenance module 308 is configured to interact with the other nodes to implement the distributed authentication protocol. In one preferred example the nodes may interact to implement a blockchain protocol. Blockchain protocols provide for a distributed database comprising an ordered chain of data blocks. Each block links to the previous block in the chain and contains data to confirm the integrity of the previous block. In some examples, each block contains a time stamp. Each block may be linked to the previous block in the chain through including a hash of the previous block. In some blockchains the chain may be validated collectively by nodes that participate in the protocol. Data stored on the blockchain is generally considered to be incorruptible. Every node has a copy of the block chain. The need for a centralised administrator to preserve the authenticity of the database is therefore avoided.

Suitably the blockchain functions to record information relating to use of one or more of the physical assets. That information could include, for example:

Who owns the physical asset;

The proportion of the physical asset that belongs to different owners (for scenarios in which the asset is subject to shared ownership);

Who is entitled to use the physical asset, for what purpose and when;

Any default location that is associated with the asset;

Usage data that indicates how the asset has been used, including tracking data; and Usage fees allocated to owners in respect of use of the asset.

In one example, there may be an intermediate level of storage in which at least some real-time data of the system is stored. This intermediate storage may be a trusted database. The blockchain may indicate the database and/or the location of relevant information stored in it. In this implementation, node 103 can query the blockchain for the latest information about a particular vehicle. The blockchain stores a record indicating the trusted database and/or location where the latest information on that vehicle is stored. Updates to information regarding the vehicle can be made in the database. The database's authority can be revoked by a new block being introduced to the blockchain which indicates a new trusted location for that vehicle. This approach has the advantage that it may be quicker for a user to access or change information about a particular vehicle. The database can be used as a temporary cache, and changes to the database can be propagated in due course to the blockchain.

The node 303 also comprises a fee generator 309, which is configured to generate a usage fee in dependence on the use data. That usage fee is to be assigned to one or more owners of the physical asset. This is recorded in the blockchain by the ledger maintenance module 308. In some implementations, the fee generator could be implemented separately from the blockchain and configured to pass the usage fee to the ledger maintenance module. In other implementations, the fee generator could be implemented as part of the blockchain (as shown in FIG. 3). For example, the fee generator could be implemented by a smart contract that references file locations in the blockchain. The smart contract may be a computer protocol, implemented by the fee generator, that facilitates a contract between an owner of the asset and a user of the asset. For example, the protocol may dictate an algorithm that allocates one or more users a usage fee in return for the user being permitted to make use of the asset. The appropriate fee may be generated by the fee generator inputting the use data received by input 307 into the smart contract. It is expected that the usage fee will be generated in a cryptocurrency in most implementations, although any currency (including conventional currencies) could be used.

There are a number of different factors that the fee generator 309 may consider when determining a usage fee to assign to an owner of the asset. First, the usage fee itself has to be generated. The fee will depend on the terms of the contract between the owner(s) of the asset and the user. The contract will first establish conditions under which a user is permitted to use the asset. For example, a contract will establish that a person is entitled to use the asset. It may also set limits on that usage, e.g. that the asset may only be used at a particular time of day or within a particular geographical area. It will also establish how use of the asset is to be charged for. For example, the usage fee will often be dependent on a length of time that the asset was used for or the distance that the asset has traveled. The usage fee may also be dependent on the type of locations through which the asset has traveled. For example, a car that has been driven through a busy town may be subject to greater wear and tear than a car which has been driven along country roads. The fee generator may therefore be configured to take tracking data into account when assigning a usage fee. Node 303 may also take tracking data into account whether the terms of a contract with the user have been met, e.g. if the car has kept within a proscribed geographical area or its total journey has kept within a proscribed maximum distance.

Being able to determine the location of a mobile asset is also helpful for addressing externally generated queries. For example, FIG. 3 shows a user 310 who wants to know where the nearest available car is. The user requests this information from node 303. In this example, the user uses his mobile phone 311 to send the request, but any other device could be used (such as a tablet, laptop, "smart watch" etc). The request suitably includes information relating to the location of the user.

The request triggers the node to start a location determination procedure. In a system where each car is associated with a default location (such as a given parking space), the node may start the location procedure by determining which cars have default locations that are within a predetermined distance of the user. In some implementations, the node may start by determining which cars have fixed locations (which are not necessarily default locations). For example, cars may be considered to have a fixed location if they have been in one location for a predetermined time or if they are not currently being used. This corresponds to a scenario in which cars do not necessarily have to be left in a default parking space but can be left wherever is convenient for the user at the end of the share, meaning that the car's location is fixed at the time even if it is not at some default location associated with the car. The node may also determine the last known location of the car for any cars that are not in a fixed location. For some scenarios, this information may not be that useful. For example, a car that is moving because it is being used is not available in any event. However, it is possible that in future implementations self-driving cars may move independently, in which case the node may be configured to determine their location while they are in motion. The node suitably returns a list of the cars that are closest to the location to the user to the requesting device 311. This may include all cars that are within a predetermined distance of the user. The requesting device suitably displays these locations to the user, e.g. as points on a map.

In real world scenarios, a user 310 who wants to know what cars are closest to him is most likely to be interested in cars that are available for use. The requesting device 311 may be configured to run an application that enables the user to query any of nodes 301 to 303 for information about the car sharing scheme, and particularly the location and/or availability of the cars. This application may offer user 310 the option of searching for nearby cars that are available. The node 303 may be configured to provide, in response to the request, the locations of cars that are: (i) closest to the location of the user; and (ii) available for sharing. As explained above, the node may determine whether a car is available for sharing in dependence on smart contracts that govern usage of the cars.

Node 303 may use any information in the blockchain to determine an indication of where a car is located. Examples include records that memorialise permanent or semi-permanent data associated with the cars themselves, such as any default locations. The node can also use data that is indicative of changing locations of the cars. For example, tracking data may not only be used to determine appropriate usage fees to charge the user, but may also be used for determining the car's location for reasons that are unconnected with current use of the car (e.g. to respond to a request for the cars closest to a given location).

The apparatus and methods described above may enable physical assets to be efficiently shared between large numbers of people. This provides an effective use of resources, enables shared ownership arrangements and provides asset owners with a means of generating revenue. Existing asset sharing schemes are usually administered by some central body, which can make it impractical for individuals to replicate the same model. The blockchain renders a central intermediary unnecessary, with the result that a shared ownership scheme is cheaper and easier for individuals to implement. The blockchain also removes any privacy concerns that might be associated with individuals' actions being monitored by a third party. This is because, even if a central intermediary is involved, each node has the same level of access to individuals' data as any other node, which helps generate trust between participants in the scheme and any intermediary. Finally, centralised databases can be vulnerable to hacking, whereas blockchains tend to be more robust due to the lack of a centralised point of vulnerability. Blockchains, in particular, are considered to be inherently resistant to modification of the data since data stored in a block cannot be altered retroactively.

The structures shown in FIGS. 1 and 3 (and all the block apparatus diagrams included herein) are intended to correspond to a number of functional blocks. This is for illustrative purposes only. FIGS. 1 and 3 are not intended to define a strict division between different parts of hardware on a chip or between different programs, procedures or functions in software. In some embodiments, some or all of the techniques described herein may be performed wholly or partly by a processor acting under software control. For example, the location unit is likely to be a processor that is configured to implement algorithms that can determine the likely location of an asset. In another example, the ledger maintenance module is likely to be a processor that is configured to implement the consensus algorithms that create the blockchain across the nodes. In some embodiments, some or all of the techniques described herein are likely to be performed wholly or partly in hardware. For example, the node's input may be a socket that is configured to receive incoming data.

Figure 4:
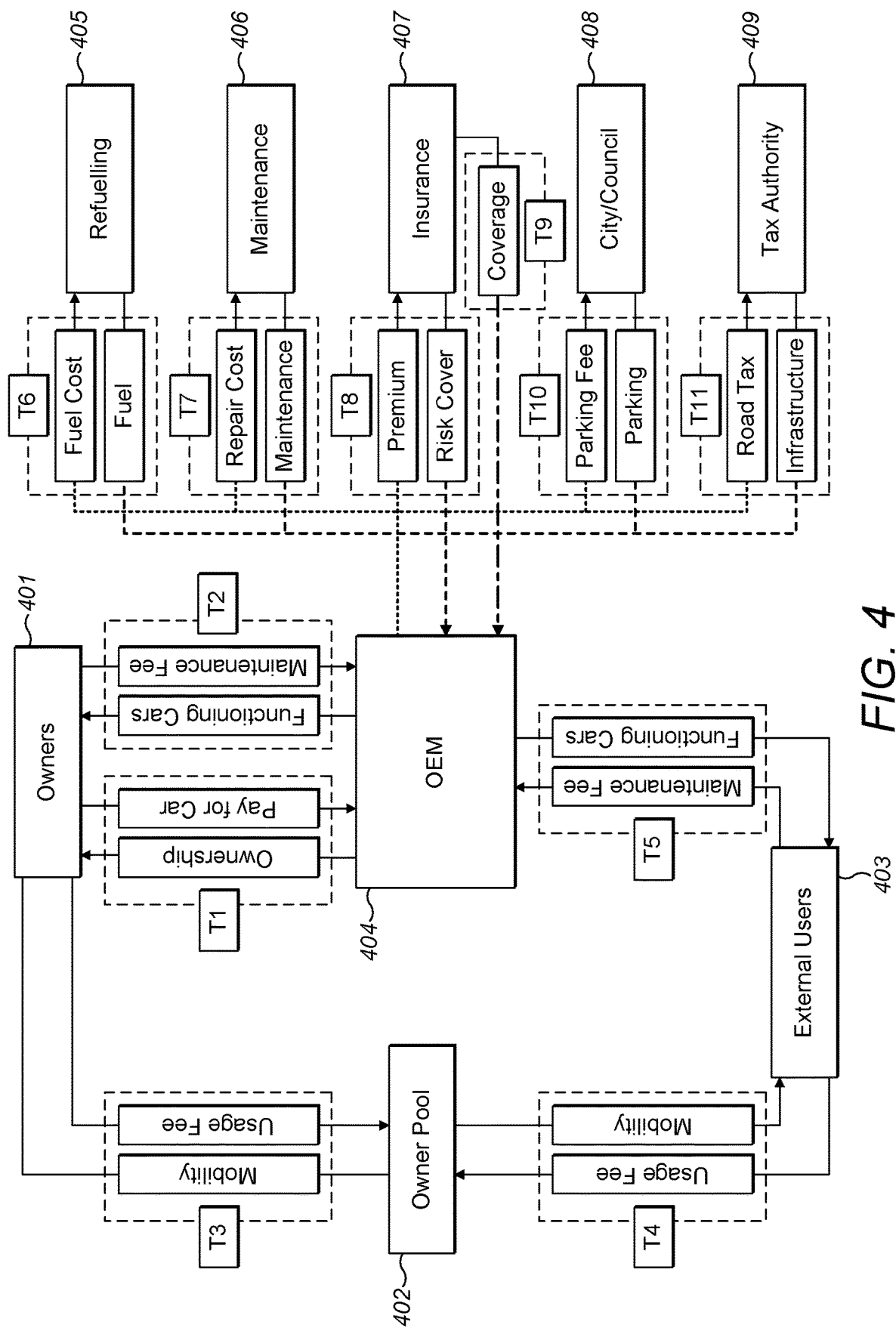
FIG. 4 shows an example of a shared car ownership scheme.
Figure 5:
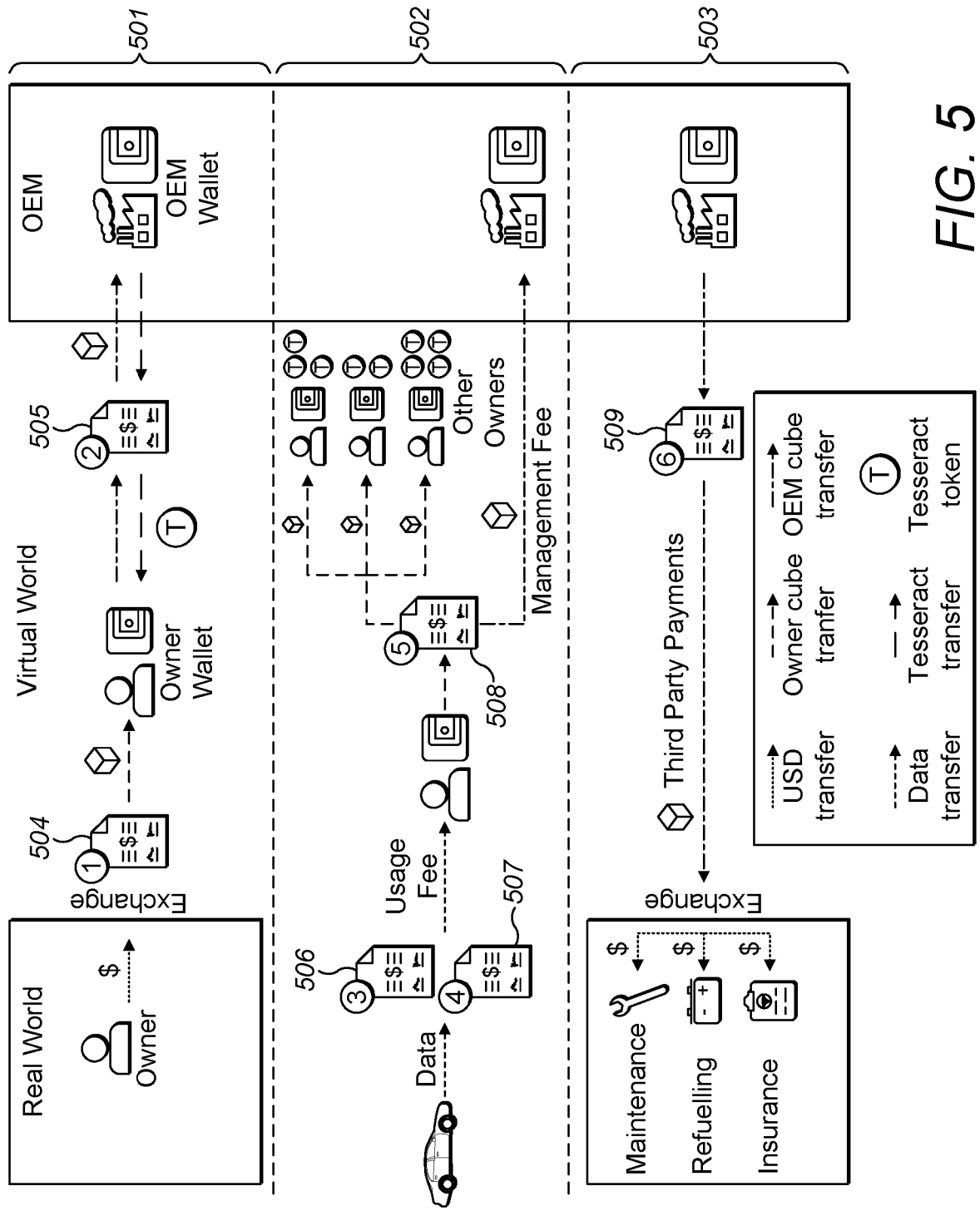
FIG. 5 shows an example of smart contracts involved in implementing a shared car ownership scheme.

FIGS. 4 and 5 show an example of a car share scheme in more detail, to give an overview of how the scheme might work in practice. It is envisaged that the scheme will be administered via a blockchain. It is also envisaged that the scheme will enable a pool of cars to be shared amongst multiple owners and non-owners. Such a scheme might be particularly well suited to cities. In such an environment, it is helpful for users to be able to identify where the nearest available car might be.

FIG. 4 shows some of the transactions that might be involved in implementing the scheme. In this scheme owners (401) pay to gain part-ownership of a car fleet. Owners pay each other for drive time based on a usage algorithm. External users (i.e. non-owners, 403) can also pay owners to use the cars. In this example, the scheme is run by the OEM (original equipment manufacturer, 404). The OEM provides the cars initially and thereafter continues to maintain the cars and administer the shared ownership scheme in return for a management fee. The OEM also manages third party payments to external bodies such as garages and insurers (405-409). It may also manage and maintain a blockchain that is used to record all transactions that arise during administration of the scheme.

FIG. 5 shows examples of smart contracts that may be involved in implementing a car share scheme. These smart contracts may reference locations of particular files in the blockchain. They can be divided into three categories:

The first category (501) implements transactions that facilitate owners and external users joining the scheme. This involves owners and external users purchasing cryptocurrency "cubes" on a currency exchange. Owners may also purchase tokens to signify their share of car ownership. Separate financing companies could provide funding for owners to buy tokens. These steps may involve the following smart contracts:

Contract 1: this contract (504) controls the issuance of cubes by creating cubes as units of a cryptocurrency, transacting conventional currency into cubes and moving cubes into owner/external user wallets.

Contract 2: this contract (505) controls the purchase of assets that denote percentage of ownership. These ownership shares may be recorded in an asset contract on the blockchain.

The second category (502) implements transactions that facilitate driving a car and paying for the journey. This involves data gathered by sensors on the car being input into a smart contract so that a "usage charge algorithm" can generate the usage fee. The driver is charged the usage fee, which is then automatically divided between owners depending on their respective number of tokens. Data relating to the journey can also be used to generate a per-journey management fee that can be included in the usage fee, but which is transferred to the OEM rather than the owners. These steps may involve the following smart contracts:

Contract 3: this contract (506) generates the owner part of the usage fee by inputting usage data received from the car and/or additional external sources into a smart contract that uses the owner usage algorithm to calculate the owner part of the usage fee. Usage data may include the tracking and location-related data referred to above, together with other use-related data.

Contract 4: this contract (507) generates the OEM part of the usage fee by inputting usage data from the car into a smart contract that uses the external usage algorithm to calculate the OEM part of the usage fee. Usage data may include the tracking and location-related data referred to above, together with other use-related data.

Contract 5: this contract (508) transfers appropriate parts of the usage charge from the driver's wallet into owners' wallets and from the driver's wallet into the OEM wallet.

The third category (503) implements transactions that facilitate management of the scheme. The cars and schemes are maintained by the OEM, for which users pay the OEM a per journey or monthly management fee. This involves the OEM selling cubes derived from the management fee for conventional currency, which is then used to pay third parties for fuel, maintenance, insurance, parking and other running costs. These steps may involve the following smart contracts:

Contract 6: this contract (509) receives a breakdown of the management fee and makes automated, retrospective payment to third parties based on drive data from the car.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A node for implementing an asset sharing scheme in which the asset is mobile, the node being configured to:
   interact with other nodes to implement a distributed authentication protocol;
   determine whether the mobile asset is available for being shared in dependence on a smart contract being either open or closed, wherein the smart contract is configured to access data recorded in a data corpus authenticated by the distributed authentication protocol implemented by the node and the other nodes; and
   determine a location of the mobile asset using:
      data that indicates whether the mobile asset is currently available for being shared, the data being recorded in the data corpus authenticated by the distributed authentication protocol;
      data indicating the smart contract being either open or closed; and
      a fixed location that is stored in respect to the mobile asset location in the data corpus.

2. The node as claimed in claim 1, wherein the fixed location is a default location associated with the asset, and the node is configured to not determine that a mobile asset that is unavailable for being shared is at its fixed location.

3. The node as claimed in claim 1, wherein the node is configured to determine the location of the mobile asset in dependence on data received from the mobile asset and recorded in the data corpus.

4. The node as claimed in claim 1, wherein the node is configured to determine the location of the mobile asset responsive to a request from a user that identifies a location of that user.

5. The node as claimed in claim 4, wherein the asset sharing scheme incorporates a plurality of mobile assets and the node is configured to identify, responsive to the request, one or more of the plurality of mobile assets that are closest to the location of the user.

6. The node as claimed in claim 5, wherein the node is configured to identify which of the one or more mobile assets closest to the location of the user is available for sharing.

7. The node as claimed in claim 5, wherein the node is configured to provide, to the user, locations of mobile assets that are: (i) a mobile asset that is closest to the location of the user; and (ii) available for sharing.

8. The node as claimed in claim 1, wherein the node is configured to determine a usage fee for use of the asset based on the determined location.

9. The node as claimed in claim 1, wherein the node is configured to determine whether use of the asset complies with a contract based on the determined location.

10. The node as claimed in claim 1, wherein the node is configured to receive data relating to the mobile asset and record it in the data corpus.

11. The node as claimed in claim 1, wherein the distributed authentication protocol is a blockchain protocol.

12. A method for implementing an asset sharing scheme in which the asset is mobile, the method comprising:

implementing a distributed authentication protocol;

determining whether the mobile asset is available for being shared in dependence on a smart contract being either open or closed, wherein the smart contract is configured to access data recorded in a data corpus authenticated by the distributed authentication protocol; and determining a location of the mobile asset using:

data that indicates whether the mobile asset is currently available for being shared, the data being recorded in the data corpus authenticated by the distributed authentication protocol;

data indicating the smart contract being either open or closed; and a fixed location that is stored in respect to the mobile asset location in the data corpus.

13. A node for implementing an asset sharing scheme in which the asset is mobile, the node being configured to:

interact with other nodes to implement a distributed authentication protocol;

determine whether the mobile asset is available for being shared in dependence on a smart contract being open or closed, wherein the smart contract is configured to access data recorded in a data corpus authenticated by the distributed authentication protocol;

when the smart contract is determined to be closed, determine a location of the mobile asset as being in a default location if the data indicates that the mobile asset is currently available for being shared based on the smart contract being closed; and when the smart contract is determined to be open, determine a location of the mobile asset as not being in the default location if the data indicates that the mobile asset is currently unavailable for being shared based on the smart contract being open.

* * * * *